United States Patent Office 3,637,684
Patented Jan. 25, 1972

3,637,684
PREPARATION OF HETEROCYCLOIMIDAZOLES
Irving M. Goldman, Niantic, Conn., assignor to
Pfizer Inc., New York, N.Y.
No Drawing. Filed Jan. 5, 1968, Ser. No. 695,861
Int. Cl. C07d 51/46
U.S. Cl. 260—248 AS                                    2 Claims

ABSTRACT OF THE DISCLOSURE 1,3-dimethyl - 1,2,3,4 - tetrahydropyrido[2,1-f]purine-2,4-dione is prepared by extruding sulfur monoxide from 1,3 - dimethyl - 1,2,3,4 - tetrahydropyrido[1,2-b]6H- pyrimido[4,5-e][1,2,4]thiadiazine-2,4,5-trione, which is prepared by treating 1,3-dimethyl-6-(2-pyridylamino)uracil with thionyl chloride. The extrusion provides a general route to various imidazoles, especially heterocycloimidazoles, through intermediate 2H-1,2,4-thiadiazine-1-oxides which can be prepared from N-vinylamidines. An alternative route is heating 1,3-dimethyl-5-halo-6-(2-pyridylamino)uracil. Novel 1,3-dimethyl-1,2,3,4-tetrahydroheterocyclo[x,y-f]purine-2,4-diones are useful for a variety of biological and chemotherapeutic purposes.

BACKGROUND OF THE INVENTION

This invention relates to processes for the preparation of heterocyclic compounds and to novel heterocycloimidazoles which are useful biological and chemotherapeutic agents.

The synthesis of organic fused ring systems often presents the organic chemist with many problems, among which are the need for unavailable substrate material, multiple steps and low yield. These difficulties increase as the complexity of the desired compound increases. Thus, the prior art teaches a variety of means for synthesizing imidazoles, but many are not suitable for the synthesis of imidazoles bearing a fused organic ring. Still fewer of the prior art methods are adequate for the synthesis of imidazoles having two rings fused thereto.

It is an object of this invention to provide advantageous methods for the preparation of certain complex imidazoles. These methods utilize easily obtained substrates and reagents; further, they require a minimum of individual steps and afford the desired products in good yield.

Certain 1,3-dimethyl - 1,2,3,4 - tetrahydroheterocyclo-[x,y-f]purine-2,4-diones which are synthesized by the instant methods have been found to exhibit unexpected and useful biological and pharmacological activity.

SUMMARY OF THE INVENTION

This invention provides a means for the preparation of imidazoles from compounds containing an activated 2H-1,2,4-thiadiazinyl-1-oxide moiety of the formula

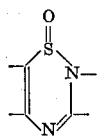

Extrusion of sulfur monoxide from these activated moieties is an unexpectedly facile reaction whereby the thiadiazinyl ring contracts to form the desired imidazole system.

An "activated" thiadiazinyl-1-oxide moiety in this invention is one which is capable of being prepared by reacting a N-vinylamidine moiety of the formula

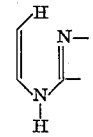

with thionyl chloride. Similarly, an "activated" N-vinylamidine moiety is one which forms a 2H-1,2,4-thiadiazinyl-1-oxide upon treatment with thionyl chloride. In a preferred embodiment of this invention, the 2H-1,2,4-thiadiazinyl-1-oxide is, in fact, prepared from the N-vinylamidine compound.

This process is especially advantageous when the vinyl and amidine substituents of the activated N-vinylamidine moiety are each taken together to provide a cyclic system, thereby resulting in a fused polycyclic imidazole product. Thus, in a preferred embodiment of this invention, the two amidine substituents provide a heteroaromatic ring system, and in a more preferred embodiment the vinyl substituents provide a uracil system. This provides for the preparation of 1,3-dimethyl-1,2,3,4-tetrahydroheterocyclo-[x,y-b] - 6H - pyrimido[4,5-e][1,2,4]thiadiazine - 2,4,5-triones (I) and 1,3-dimethyl-1,2,3,4-tetrahydroheterocyclo-[x,y-f]purine-2,4-diones (II) of the formulae

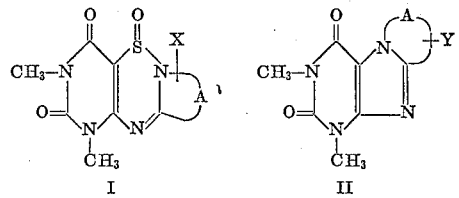

wherein

A is such that

is a heteroaromatic ring system, e.g. 2-pyridyl, 2-pyrazinyl, 2-pyrimidyl, 4-pyrimidyl, 2-(1,3,5-triazinyl), 3-(1,2,4-triazinyl), 5 - (1,2,4 - triazinyl), 6-(1,2,4-triazinyl), 3-pyridazinyl, 2-oxazolyl, 3-isoxazolyl, 2-(1,3,4-oxadiazolyl), 3-furazanyl, 2-thiazolyl, 3-isothiazolyl, 2-(1,3,4-thiadiazolyl), 2-(1-methyl)imidazolyl, 2-quinolyl, 1-isoquinolyl and 4-quinazolyl;

X is selected from the group consisting of hydrogen, alkyl containing up to 6 carbon atoms, alkoxy containing up to 6 carbon atoms, alkoxymethyl containing from 2 to 5 carbon atoms, halogen, chloroformyl, chloroformylalkyl containing from 2 to 5 carbon atoms, carbalkoxy containing from 2 to 5 carbon atoms and perfluoroalkyl containing up to 6 carbon atoms; and Y is seelcted from the group consisting of hydrogen, alkyl containing up to 6 carbon atoms, alkoxy containing up to 6 carbon atoms, alkoxymethyl containing up to 6 carbon atoms, halogen, carboxyl, carbalkoxy containing from 2 to 5 carbon atoms, carboxyalkyl containing from 2 to 5 carbon atoms, chloroformyl, chloroformylalkyl containing from 2 to 5 carbon atoms, perfluoroalkyl containing up to 6 carbon atoms, halomethyl, hydroxyl, hydroxymethyl, di(lower alkyl)aminomethyl, 1 - (4 - methylpiperazino)methyl, 1 - (4 - methylpiperazino)formyl and 1 - (2,6 - dimethylpiperdino) formyl.

Nomenclature used herein to designate polycyclic compounds I and II is consistent with that of Chemical Abstracts. For example, when the substrate material containing the N-vinylamidine moiety is 1,3-dimethyl - 6 - (2-pyridylamino)-uracil, the ring systems obtained are numbered as follows:

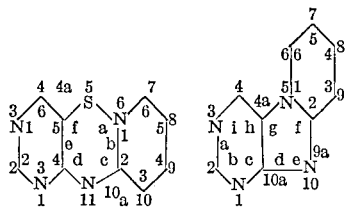

with the interior numbers and letters used to specify the manner of fusion and the exterior numbers used to specify positions on the final ring system. The thiadiazine and purine products obtained from said pyridylaminouracil are, respectively, 1,3 - dimethyl - 1,2,3,4 - tetrahydro [1,2-b] - 6H - pyrimido[4,5-e][1,2,4]thiadiazine - 2,4,5-trione and 1,3-dimethyl - 1,2,3,4 - tetrahydropyrido[2,1-f]purine-2,4-dione.

Novel purines of Formula II have been found to inhibit 3',5'-nucleotide phosphodiesterase enzyme activity; also, they exhibit varied pharmacological activity thereby being useful as chemotherapeutic agents. In addition, many are useful as intermediates of other compounds within the class which are useful agents.

Certain heterocycloimidazoles of the instant invention or precursors thereto may be sensitive to treatment with thionyl chloride, and therefore may be more readily prepared by simply heating an appropriate 1,3-dimethyl-6-(substtiuted amino)uracil having a chloro or bromo substituent in the 5-position. These 5-halouracils, in turn, are prepared by treating 1,3-dimethyl - 6 - chlorouracil with phosphorous pentachloride or phosphorous pentabromide, and condensing the resulting 1,3-dimethyl-5,6-dihalouracil with the appropriate heterocyclic amine.

DETAILED DESCRIPTION OF THE INVENTION

It has been found that 2H - 1,2,4 - thiadiazinyl - 1-oxides which can be prepared from N-vinylamidines undergo facile dethionylation to afford imidazoles, according to the following sequence:

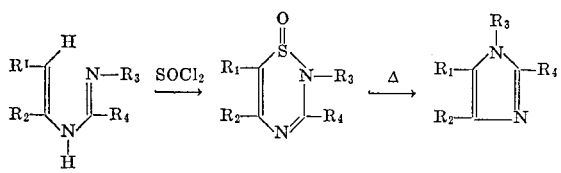

Under certain conditions, the ring-chain tautomer of the formula

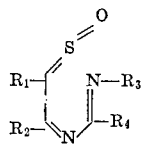

may be a more accurate representation of the material than the sulfinamide form of thiadiazinyl-1-oxide. However, the sulfinamide form will be used consistently throughout this disclosure. Inasmuch as dethionylations are not commonly reported in the prior art, sulfur monoxide extrusion according to the instant process is unexpected.

In order to determine whether a specific 2H - 1,2,4-thiadiazinyl-1-oxide will undergo the desired dethionylation, it is necessary to determine whether or not it is activated, i.e. whether it can be prepared from a N-vinylamidine. Inasmuch as this initial conversion utilizes thionyl chloride, the usual precautions observed when this reagent is used should be followed, for example, the use of an anhydrous system and the optional use of hydrogen chloride scavenger such as powdered sodium carbonate. Also, the reaction should be performed in a liquid reaction medium, commonly a solvent-amount of thionyl chloride. Common reaction-inert organic solvents might also be used, such as chloroform, methylene chloride and ether, and in this event, at least a molar equivalent amount of thionyl chloride is desirable for best results. It is noted that should the substrate contain an additional thionyl chloride-reactive site, removed from N-vinylamidine moiety, additional thionyl chloride might be necessary for maximum yield. Any 2H - 1,2,4 - thiadiazinyl-1-oxide which is formed by this reaction is activated in the sense of the instant invention and will undergo dethionylation to afford an imidazole.

Depending upon the relative stability of the particular 2H - 1,2,4 - thiadiazinyl - 1 - oxide, the actual product isolated from said thionyl chloride reaction may be the thiadiazinyl - 1 - oxide or the imidazole. If it is desirable to isolate a relatively unstable thiadiazinyl - 1 - oxide, the thionyl chloride reaction may be conducted at temperatures sufficiently low to avoid the facile dethionylation.

Usually, however, one will wish to proceed in as direct a manner as possible from the substrate N-vinylamidine to the imidazole, in which event the 2H - 1,2,4 - thiadiazinyl - 1 - oxide intermediate would probably not be isolated unless necessary. Formation of the imidazole from the N-vinylamidine might proceed in one or more steps, depending upon reaction conditions and relative stability of the intermediate 2H - 1,2,4 - thiadiazinyl-1-oxide. For example, when conducting the reaction in a solvent-amount of thionyl chloride, refluxing a solution of certain N-vinylamidine substrates for five minutes has been found to cause direct conversion to the desired imidazole. Other N-vinylamidines are converted to the thiadiazinyl intermediate under such conditions, which must then be heated as high as 300° C. to cause the desired dethionylation. Still other N-vinylamidines may either be converted to the thiadiazinyl intermediates by dissolving them in thionyl chloride at room temperature, or directly to the imidazole by refluxing in thionyl chloride.

Similarly, in the event that the 2H-1,2,4-thiadiazinyl-1-oxides are isolated, they may be converted to imidazoles by conditions as diverse as refluxing in thionyl chloride for 5–90 minutes, heating to 150° C. at 0.05 mm. Hg pressure, or heating to 300° C. for ten minutes at atmospheric pressure.

Thus, appropriate reaction conditions for any conversion within the scope of the instant process must be determined for each particular substrate used, and this might be done by simple experimentation obvious to one skilled in the art. Any of numerous standard laboratory procedures might be used to determine whether the product of the thionyl chloride reaction is the 2H-1,2,4-thiadiazinyl-1-oxide or whether dethionylation occurred to afford the imidazole, for example spectrophotometry, elemental analysis and molecular weight determination. Of course, the reaction product must be highly purified prior to such testing so that results are not obscured by the presence of residual thionyl chloride. Should the product be the thiadiazinyl-1-oxide, the reaction conditions used were insufficient to cause dethionylation to the imadazole, and appropriately higher reaction temperature, longer time, or lower pressure should be used. Of course, one would proceed in just the opposite manner if it were desirable to stop the reaction at the thiadiazinyl-1-oxide stage, and not proceed to dethionylation.

In light of the above considerations, procedures along the following lines might be used, with the actual conditions dependent upon solubility, reactivity and stability of the N-vinylamidine and 2H-1,2,4-thiadiazinyl-1-oxide:

(A) the substrate N-vinylamidine is dissolved in an excess of thionyl chloride and the solution is refluxed for a period of time after which the imidazole product is isolated; (B) the substrate is dissolved in an excess of thionyl chloride and the solution is refluxed for a period of time in the presence of an acid acceptor such as finely powdered sodium or potassium carbonate, followed by isolation of the imidazole; (C) the substrate is dissolved in an excess of cold thionyl chloride, and after a short period of time at moderate temperature the solvent is removed and the isolated 2H-1,2,4-thiadiazinyl-1-oxide is converted thermally to the imidazole product, under reduced pressure if necessary; (D) procedures as in A–C where as little as a molar equivalent amount of thionyl chloride is used in conjunction with the use of inert solvents.

In either instance, the reaction product, whether it be the imidazole or the thiadiazinyl-1-oxide, can be isolated from the reaction mixture by standard means readily selected by one skilled in the art on the basis of the reaction conditions used and the stability of the material obtained. For example, any solvents may be removed in vacuo and the product might be isolated from the residue by distillation, recrystallization, extraction, chromatography, sublimination, or a combination of these.

As indicated hereinbefore, the criterion for determining whether a particular imidazole can be prepared by the instant process is whether treating the corresponding N-vinylamidine with thionyl chloride will afford the 2H-1,2,4-thiadiazinyl-1-oxide. There are several considerations or factors which one skilled in the art will recognize as bearing on the degree of activation of any particular N-vinylamidine or thiadiazinyl-1-oxide.

A consideration of primary importance in determining activation of these moieties is the requirement that the nitrogen atom bridging the two parts of the N-vinylamidine moiety bear a hydrogen atom and that the β-vinyl carbon atom bear a substituent capable of leaving as a cation; hydrogen is preferred for this purpose but chlorine, bromine and the like might be suitable in certain instances. Substituents meeting these requirements are necessary for the reaction to proceed, and if either is lacking the substrate moiety with not undergo conversion to the imidazole. Furthermore, said substituent at the β-vinyl carbon atom is preferably situated in the cis position relative to aforesaid "brdging" nitrogen atom. Having the substituent situated in this conformation results in a minimum of steric hindrance to ring closure.

The four other free positions of the N-vinylamidine can be bonded to a great variety of groups to render the moiety activated, with the degree of activation being dependent upon a variety of factors. In order that a N-vinylamidine can be converted to a 2H-1,2,4-thiadiazinyl-1-oxide, it is necessary that the double-bonded nitrogen and β-vinyl carbon atoms of the N-vinylamidine moiety be appropriately reactive. The reaction proceeds by electrophilic attack at both these positions, presumably by initial formation of an unstable N-chlorosulfinamide intermediate; therefore, substituents must not decrease the electron density excessively at these positions via inductive and conjugative effects. Also, substituents should not interfere with the reaction by steric interference or by undergoing reaction with thionyl chloride themselves at sites adjacent to the moiety. Thus, it is desirable that the N-vinylamidine substituents not be strongly electron-withdrawing and that they be inert to thionyl chloride under the reaction conditions.

These factors and others which will be apparent to those skilled in the art are understood to be merely indicia of activated N-vinylamidine and 2H - 1,2,4 - thiadiazinyl-1-oxide moieties, and are not to be considered as defining activation. Insofar as they bear on the facility of conversion of the former moiety to the latter, they are relevant. However, the scope of the instant process is defined not by such factors and considerations but, rather, by the actual fact of conversion from N-vinylamidine to thiadiazinyl-1-oxide.

A preferred embodiment of the process of the instant invention is the conversion to imidazoles of compounds containing activated moieties of the formulae

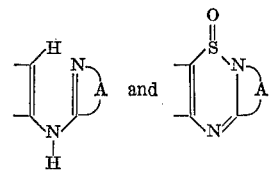

wherein A is such that

is a heteroaromatic ring system, for example, wherein

consists essentially of system selected from the group consisting of 2-pyridyl, 2-pyrazinyl, 2-pyrimidyl, 4-pyrimidyl, 2-(1,3,5-triazinyl), 3-(1,2,4-triazinyl), 5-(1,2,4-triazinyl), 6-(1,2,4-triazinyl), 3-pyridazinyl, 2-oxazolyl, 3-isoxazolyl, 2-(1,3,4-oxadiazolyl), 3-furazanyl, 2-thiazolyl, 3-isothiazolyl, 2-(1,3,4-thiadiazolyl), 2-(1-methyl)imidazolyl, 2-quinolyl, 1-isoquinolyl and 4-quinazolyl. The resulting imidazoles, bearing an aromatic ring fused at the 1,2-position, are readily formed using reaction conditions discussed hereinbefore.

Especially preferred is the conversion of compounds of the formulae

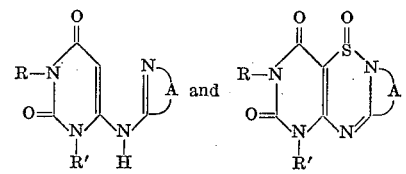

wherein A is as aforesaid and R and R' are each alkyl containing up to 6 carbon atoms or alkenyl containing up to 6 carbon atoms. When R and R' are each methyl, novel 1,3 - dimethyl-1,2,3,4-tetrahydroheterocyclo[x,y-f] purine-2,4-diones are obtained, which compounds have unexpected utility.

Direct preparation of certain of these heterocyclopurine, or heterocycloxanthine, derivatives is achieved by subjecting aminouracils of the formula

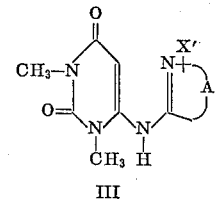

III wherein A is as aforesaid and X' is selected from the group consisting of hydrogen, alkyl containing up to 6 carbon atoms, alkoxy containing up to 6 carbon atoms, alkoxymethyl containing up to 6 carbon atoms, halogen, carboxyl, carbalkoxy containing from 2 to 5 carbon atoms, carboxyalkyl containing from 2 to 5 carbon atoms and perfluoroalkyl containing up to 6 carbon atoms to appropriate conditions of the aforesaid reaction with thionyl chloride, thereby obtaining aforesaid substituted 2H-1,2,4-thiadiazinyl-1-oxides of Formula I. In this way, imidazoles of Formula II wherein Y is X are formed directly. Compounds of Formula II wherein Y is other than X, are conveniently prepared from other compounds of Formula II which can be prepared directly by the instant procedure, these transformations of Y being achieved by common organic reactions well known to those with ordinary skill in the art. For example, a convenient route is the conversion of Y from methyl to bromomethyl by treatment with N-bromosuccinimide in the presence of peroxide and light, followed by conversion of the bromomethyl compound to a great variety of other compounds. Thus, methyl and bromomethyl are preferred embodiments of Y in compounds of Formula II, rendering X and X' as methyl preferred embodiments of compounds of Formulae I and III, respectively.

On the basis of other considerations discussed hereinafter, additional preferred embodiments of compounds of Formula II are those wherein Y is hydrogen and A is such that

is 2-pyridyl and 2-pyrimidyl. Thus, specific preferred embodiments are 1,3,8 - trimethyl-1,2,3,4-tetrahydropyrido-[2,1-f]purine-2,4-dione, wherein A is such that

is 2-pyridyl and Y is 8-methyl; 1,3-methyl-8-bromoethyl-1,2,3,4 - tetrahydropyrido[2,1-f]purine-2,4-dione, wherein A is such that

is 2-pyridyl and Y is 8-bromomethyl; 1,3-dimethyl-1,2,3,4 - tetrahydropyrimido[2,1-f]purine-2,4-dione, wherein A is such that

is 2-pyrimidyl and Y is hydrogen; and 1,3,8-trimethyl-1,2,3,4 - tetrahydropyrimido[2,1-f]purine - 2,4 - dione, wherein A is such that

is 2-pyrimidyl and Y is 8-methyl. For synthetic purposes, therefore, specific preferred embodiments of compounds of Formulae I and III are those from which aforesaid preferred purines are prepared, viz., 1,3-dimethyl-6-[2-(4-methyl)pyridylamino]uracil and 1,3,9-trimethyl-1,2,3,4 - tetrahydropyrido[1,2-b]-6H-pyrimido[4,5 - e][1,2,4] thiadiazine - 2,4,5 - trione; 1,3-dimethyl-6-(2-pyrimidyl-amino)uracil and 1,3-dimethyl-1,2,3,4-tetrahydropyrimido[1,2 - b]6H - pyrimido[4,5-e][1,2,4]thiadiazine - 2,4,5-trione; and 1,3-dimethyl-6-[2-(4-methyl)pyrimidylamino] uracil and 1,3,9-trimethyl-1,2,3,4-tetrahydropyrimido[1,2-b]-6H-pyrimido[4,5-e][1,2,4]thiadiazine-2,4,5-trione.

There is evidence that compounds of the formula

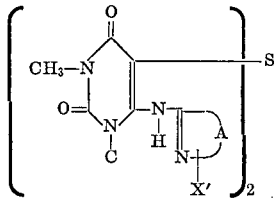

and the corresponding sulfoxides are sometimes formed as side products in the instant process, with thionyl chloride serving to establish an equilibrium between the sulfide and sulfoxide forms of the dimeric material. These materials are normally converted to the desired imidazoles by further treatment with thionyl chloride under the standard reaction conditions, or by pyrolysis in a separate step with concomitant formation of one mole of substrate material. Also, they can be independently synthesized in a variety of ways familiar to one skilled in the art.

An alternative synthesis of 1,3-dimethyl-1,2,3,4-tetrahydroheterocyclo[x,y-f]purine-2,4-diones has been found to be especially effective when the fused heterocyclo ring system is sensitive to thionyl chloride, thereby making aforesaid treatment with thionyl chloride less preferred. This alternative procedure involves the conversion of 5,6-dichloro - 1,3-dimethyluracil or 5-bromo-6-chloro-1,3-dimethyluracil to compounds of the formula

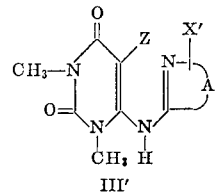

III' wherein A and X' are as specified hereinbefore for compounds of Formula III and Z is chlorine or bromine. Preferably Z is chlorine. Compounds of Formula III' may be isolated or may be converted directly to the corresponding compound of Formula II.

It has been found that 5,6-dichloro-1,3-dimethyluracil can be effectively synthesized by appropriate treatment of 6-chloro-1,3-dimethyluracil with phosphorus pentachloride in phosphorous oxychloride solution. At least about a molar equivalent amount of phosphorus pentachloride is preferably used, and more preferably, a 0.5–1.0 molar excess is used. Less than a molar equivalent amount may be used but will result in a decreased yield of the product. The reagent should be added in a controlled manner over the period of reaction. Reaction time is not critical, but about four hours has been found to be adequate at the reflux temperature of phosphorous oxychloride. Of course, lower reaction temperatures will require a corresponding increase in reaction time. The dichloro product is easily isolated by oridinary techniques, for example by solvent removal and purification of the residue. Unexpectedly, virtually no perchloro material is formed under these conditions and the yield of the desired dichloro material is unexpectedly greater than is achieved by use of thionyl chloride or chlorine as the chlorinating agents.

Use of phosphorous pentabromide in place of aforesaid phosphorous pentachloride provides an equivalent procedure for the synthesis of 5-bromo-6-chloro-1,3-dimethyluracil.

Heating either of these two 5-halo-6-chloro-1,3-dimethyluracils with a heterocyclic amine of the formula

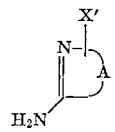

wherein A and X' are as aforesaid results in the formation of the desired imidazole. The intermediate of Formula III' may be isolated by using an alkali metal salt such as the sodium or potassium salt of the amine and running the condensation reaction, preferably in an inert solvent, such as dimethylsulfoxide, at moderate temperatures. This intermediate can then be isolated by standard techniques and converted to the desired imidazole by heating.

Alternatively, the two substrates can be heated together initially to afford the desired imidazole directly. Whether this is done or the intermediate of Formula III' is heated in a separate step, a temperature sufficiently high to cause elimination of the 5-halo substituent is necessary. If the reaction is to be performed in a single step, temperature must be sufficient to cause evolution of two molar equivalents of hydrogen halide, whereas only one equivalent will be generated if the intermediate of Formula III' is to be isolated and heated in a second step. Of course, the final equivalent will be hydrogen chloride if a 5-chlorouracil is used, and will be hydrogen bromide if a 5-bromouracil is used. Temperature of about 250° C. have been found to be adequate and the heating may be performed in a suitably high-boiling solvent or without solvent. As little as 5 minutes heating at 250° C. has been found to be adequate in some instances, however time is usually not a critical factor.

It is noted that the condensation of the amine and the uracil proceeds selectively, with loss of the 6-chloro-group from the uracil occurring in all instances rather than the 5-chloro or 5-bromo group.

The novel 1,3 - dimethyl-1,2,3,4-tetrahydroheterocyclo[x,y-f]purine-2,4-diones of the instant invention inhibit the activity of the enzyme cyclic 3',5'-nucleotide phosphodiesterase, which catalyzes the conversion of adenosine-3',5'-monophosphate (cyclic 3',5'-AMP) to adenosine-5'-monophosphate (5'-AMP). Thus, in systems showing phosphodiesterase activity in which it is desirable to maintain high cyclic 3',5'-AMP level, the instant compounds might be used to great advantage. The instant compounds are sufficiently potent inhibitors that concentrations as low as $10^{-3}$ molar and even lower are effective. The ability of the instant compounds to inhibit the enzyme activity is of significance since it is well known that many tissues exhibit cyclic 3',5'-nucleotide phosphodiesterase activity, and that the mononucleotide cyclic 3',5'-AMP is an important regulator of numerous cellular and tissue processes, e.g. smooth muscle relaxation, lipolysis and glycogenolysis. It is well established that many well known chemotherapeutic agents, such as caffeine, theophylline, papaverine, diazoxide and thyroxine, inhibit phosphodiesterase, thereby affecting cyclic 3',5'-AMP levels, and that their particular pharmacological activity correlates with the specific tissue in which they inhibit the enzyme; they produce the same pharmacological effect as does cyclic 3',5'-AMP in a given tissue. In a similar manner, certain pharmacological activity of the instant compounds correlates with the specific tissue in which they inhibit the enzyme; smooth muscle tissue-specific inhibitors are smooth muscle relaxants, and of these, those which are bronchial tissue-specific are bronchodilators, and those which are cardiovasculature-specific are hypotensive agents.

The ability of these compounds to inhibit phosphodiesterase is not restricted to chemotherapeutic applications only, but is of substantial utility in various biological in vitro systems as well. In situations in which it is desirable to determine the characteristics and properties of certain enzyme systems other than phosphodiesterase, it often is impossible to observe and measure various effects without first inhibiting phosphodiesterase activity. For example, J. R. Turtle and D. M. Kipnis, Biochemical and Biophysical Research Communications 28, 797 (1967) required an inhibitor of phosphodiesterase activity in order to elucidate certain features of the adenyl cyclase system. However, only two substances have been found useful for this application, heretofore, the xanthines theophylline and caffeine. There are substantial disadvantages to the use of these two agents, primarily problems derived from their potency and solubility characteristics. The compounds of Formula II of the instant invention are of at least comparable potency as inhibitors of phosphodiesterase, and in addition, their multiplicity of ring systems and substituents provides for a variety of solubility, tissue permeability and tissue specificity advantages. Thus, the instant compounds allow one greater freedom in selection of conditions and procedures, since it is not necessary to adjust these features to the demands of a specific inhibitor of phosphodiesterase.

The ability of the instant compounds to inhibit the enzyme phosphodiesterase also renders them useful for the purpose of increasing the water permeability and cation transport of certain membranes derived from animal sources.

Furthermore, under circumstances when it is desirable to obtain the nucleotide cyclic 3',5'-AMP from biological sources, the instant compounds are useful for increasing the amount of material which can be isolated. Theophylline has been observed to increase the level of cyclic 3',5'-AMP in certain media as much as 1500 percent, and the instant compounds are of the same order potency.

In a related application, it is often helpful for diagnostic purposes to determine the level of cyclic 3',5'-AMP in various animal tissues. Inasmuch as the common assays for determining cyclic 3',5'-AMP content of tissue call for an inhibitor of cyclic 3',5'-nucleotide phosphodiesterase, the instant compounds can be used to great advantage.

In addition to phosphodiesterase inhibition and the chemotherapeutic properties related thereto, diuretic activity has been commonly found among compounds of Formula II. Many of the instant compounds found to be diuretic agents not only effect an increase in urine excretion but also give rise to a more favorable electrolyte excertion pattern with depressed kaliuresis. This electrolyte pattern is highly desirable since, as is generally known in the medical art, the use of many known diuretic agents leads to depletion of potassium in the body, a condition known as hypokalemia.

There is further evidence that several of the compounds of Formula II are anti-inflammatory agents, and therefore are of value in alleviating swelling and inflammation which are symptomatic of rheumatism and arthritis and of other disorders which are responsive to treatment with anti-inflammatory agents.

Furthermore, certain of the compounds of Formula II has shown activity as anti-cocidial agents.

Certain compounds of Formulae I and III have also shown activity in the same manner as have compounds of Formula II.

When compounds of the instant invention are to be used as chemotherapeutic agents, they will be administered by standard methods familiar to those skilled in the art, the particular route of administration being selected in part on the basis of the specific treatment intended. Generally, the compound will be administered with a pharmaceutical carrier selected on the basis of the chosen route of administration and standard pharmaceutical practice. For example, they may be combined with various pharmaceutically acceptable inert carriers in the form of tablets, capsules, lozenges, troches, hard candies, powders, sprays, aqueous suspensions or solutions, injectable solutions, elixirs, syrups and the like. Such carriers include solid diluents, or filters, sterile aqueous media and various non-toxic organic solvents. Moreover, the oral pharmaceutical compositions of this invention may be suitably sweetened and flavored by means of various agents of the type commonly used for this purpose.

The particular carrier selected and the proportion of active ingredient to carrier are influenced by the solubility and chemical nature of the therapeutic compounds, the chosen route of administration and the needs of the standard pharmaceutical practice. For example, where these compounds are administered orally in tablet form, excipients such as lactose, sodium citrate, calcium carbonate and dicalcium phosphate may be used. Various disintegrants such as starch, alginic acids, and certain complex silicates, together with lubricating agents such as magnesium stearate, sodium lauryl sulphate and talc, may also be used in producing tablets for oral administration of these compounds. For oral administration in capsule form, lactose and high molecular weight polyethylene glycols are among the preferred materials for use as pharmaceutically-acceptable carriers. Where aqueous suspensions are to be used for oral administration, the compounds of this invention may be combined with emulsifying or suspending agents. Diluents such as ethanol, propylene glycol, glycerine and their combinations may be employed as well as other materials.

For purposes of parenteral administration and inhalation, solutions or suspensions of the instant compounds in sesame or peanut oil or in aqueous propylene glycol solutions can be employed, as well as sterile aqueous solutions of the soluble salts described hereinafter. These particular solutions are especially suited for intramuscular and subcutaneous injection purposes. The aqueous solutions, including those of the soluble salts dissolved in pure distilled water, are also useful for intravenous injection purposes provided that their pH is properly adjusted beforehand. Such solutions should also be suitably buffered, if necessary, and the liquid diluent first rendered isotonic with sufficient saline or glucose.

The compounds may be administered by means of inhalators or other similar devices, using a spray formulated as a 1% solution.

It is necessary that the active ingredient form a proportion of the composition such that a suitable dosage form will be obtained. Obviously, several dosage unit forms may be administered at about the same time. Although compositions with less than 0.005% by weight of active ingredient might be used in certain instances, it is preferred to use compositions containing not less than 0.005% of the active ingredient; otherwise the amount of carrier becomes excessively large. Activity increases with the concentration of the active ingredient. The composition may contain 10, 50, 75, 95 or an even higher percentage by weight of the active.

The physician will determine the dosage which will be most suitable, and it will vary with the age, weight and response of the particular patient as well as with the nature and extent of the symptoms and the pharmacological characteristics of the particular agent to be administered. Generally, small doses will be administered initially, with a gradual increase in the dosage until the optimum level is determined. It will often be found that when the composition is administered orally, larger quantities of the active ingredient will be required to produce the same level as produced by a small quantity administered parenterally. In general, a dosage level within the range of from about 0.02 to about 200 mg. of active ingredient per kilogram of body weight, administered in single or multiple dose units, will be effective. Of course, there can be individual cases where higher or lower dosage levels are desirable, and such are within the scope of this invention.

Due to the variety of heterocyclic rings and substituents within the scope of the instant invention, certain of the compounds can form base salts, others can form acid addition salts, and some both. Those compounds which are susceptible to salt formation may be conveniently administered in the form of pharmaceutically-acceptable salts. By "pharmaceutically-acceptable" is meant those salts which do not have substantially greater toxicity than the free compound. For example, those compounds which form base salts might be administered in the form of the sodium, calcium or magnesium salts. The pharmaceutically acceptable acid addition salts include salts of mineral acid such as hydrochloric, hydrobromic, hydriodic, phosphoric, metaphosphoric, nitric and sulfuric acids, as well as salts of organic acids such as tartaric, acetic, citric, maleic, benzoic, glycollic, gluconic, gulonic, succinic, arylsulfonic, e.g. p-toluene sulfonic acid and the like.

The pharmacetutically-unacceptable salts, while not useful for therapy, are valuable for use in the isolation and purification of these newly discovered compounds.

Furthermore, they are useful for the preparation of the therapeutically valuable pharmaceutically - acceptable salts. Of this group, the more common salts include those formed with hydrofluoric and perchloric acids. Hydrofluoride salts are particularly useful for the preparation of the pharmaceutically-acceptable salts. The hydrochloride salts, for example, may be prepared by the solution of the hydrofluoride salts in hydrochloric acid and crystallization of the hydrochloride salt thereby formed.

The following examples are given to more fully illustrate the present invention. It is understood that these examples are for illustrative purposes only and are not to be considered as the only manner in which the invention may be embodied.

EXAMPLE I 1,3-dimethyl-6-(2-pyridylamino)uracil 2-aminopyridine (9.4 g., 0.1 mole) was dissolved in 50 ml. of dimethylsulfoxide, and sodium hydride (4.53 g. of 53% NaH in mineral oil, 0.1 mole) was added thereto portionwise with stirring and exclusion of air, over a twenty minute period. Stirring was continued for an additional ten minutes to complete the formation of the sodium salt of 2-aminopyridine, 1,3-dimethyl-6-chlorouracil (8.70 g., 0.05 mole) was added portionwise with stirring and sufficient cooling to maintain the temperature at 30–40° C. The reaction was immediate and strongly exothermic. After being stirred for an additional ten minutes, the reaction mixture was poured into 4 volumes of ice water and extracted with hexane to remove the mineral oil. The solution was then neutralized with an excess of acetic acid and the product crystallized out. Recrystallization from methylene chloride/hexane afforded the desired product, 7.5 g. (65%), M.P. 232.5–235.5° C.

Analysis.—Calc'd for $C_{11}H_{12}N_4O_2$ (percent): C, 56.89; H, 5.21; N, 24.13. Found (percent): C, 56.91; H, 5.00; N, 24.08.

EXAMPLE II

The following 1,3-dimethyl-6-aminouracils were prepared by the procedure of Example I, using an equivalent amount of appropriate amine in place of said 2-aminopyridine.

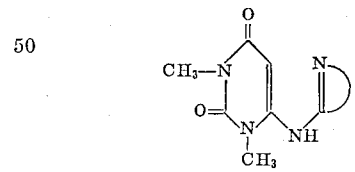

| $-C\overset{N}{\underset{\|}{\|}}$ | M.P., °C. | Analysis | | | | | |
|---|---|---|---|---|---|---|---|
| | | Calc'd | | | Found | | |
| | | C | H | N | C | H | N |
| 2-pyrimidyl | 220–221 | 51.49 | 4.75 | 30.03 | 51.38 | 4.58 | 29.49 |
| 2-pyrazinyl | ¹246 | 51.49 | 4.75 | 30.03 | 51.50 | 5.03 | 29.86 |
| 2-(5-methyl-1,3,4-thiadiazolyl) | 239–240.5 | 42.69 | 4.38 | 27.67 | 43.12 | 4.38 | 26.91 |
| 3-(6-methoxypyridazinyl) | 240.5–241.5 | 50.18 | 4.98 | 26.61 | 50.45 | 5.20 | 26.60 |
| 2-(4-methylpyridyl) | 249.5–251.5 | 58.52 | 5.73 | 22.75 | 58.61 | 5.62 | 22.69 |
| 2-(5-methylpyridyl) | 224–225.5 | 58.52 | 5.73 | 22.75 | 58.67 | 5.81 | 22.73 |
| 2-(3-methylpyridyl) | 184.5–186 | 58.52 | 5.73 | 22.75 | 58.57 | 5.80 | 22.41 |

¹ Decomposition.

EXAMPLE III

The following compounds are prepared by the procedure of Example I, using an equivalent amount of appropriate amine in place of said 2-aminopyridine.

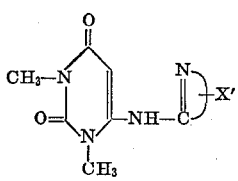

| | X' |
|---|---|
| 4-pyrimidyl | 2,6-dimethyl. |
| 2-pyrimidyl | 4-methyl. |
| 3-(1,2,4-triazinyl) | Hydrogen. |
| 2-pyrazinyl | 3-carboxyl. |
| 5-tetrazolyl | 1-methyl. |
| 5-(1,2,4-triazolyl) | 1-carboxymethyl. |
| 2-pyridinyl | 5-carboxyl. |
| 2-(1,3,5-triazinyl) | Hydrogen. |
| 6-(1,2,4-triazinyl) | 3-methyl. |
| 2-oxazolyl | 4-isopropyl. |
| 2-(1,3,4-oxadiazolyl) | Hydrogen. |
| 3-furazanyl | Do. |
| 3-isothiazolyl | 5-methyl. |
| 2-imidazolyl | 1-methyl. |
| 2-quinolyl | Hydrogen. |
| 1-isoquinolyl | Do. |
| 4-quinazolyl | Do. |

EXAMPLE III–A 1,3-dimethyl-6-(2-thiazolylamino)uracil 1,3-dimethyl-6-chlorouracil (30 g., 0.172 mole) and 2-aminothiazole (14.9 g., 0.172 mole) were dissolved in 400 ml. of dimethylsulfoxide. The solution was stirred and sodium hydride (15.96 g. of 53% NaH in mineral oil, 0.344 mole) was added over 30 minutes. The solution was stirred for an additional 10 minutes and was then poured into 4 volumes of ice water and extracted with hexane to remove the mineral oil. The solution was then neutralized with acetic acid and the product crystallized out. Recrystallization from methanol afforded the desired product, 17.6 g. (42%), M.P. 216–217° C.

*Analysis.*—Calc'd for $C_9H_{10}H_4O_2S$ (percent): C, 45.38; H, 4.23; N, 23.52. Found (percent): C, 45.36; H, 4.09; N, 23.54.

EXAMPLE III–B

The following compounds are prepared by the procedure of Example III–A, using an equivalent amount of appropriate amine in place of said 2-aminothiazole.

| | X' |
|---|---|
| 3-(1,2,4-triazinyl) | 5-carbethoxy. |
| 3-isoxazolyl | 5-bromo. |
| 2-(1,3,4-thiadiazolyl) | 5-chloro. |

EXAMPLE IV 1,3-dimethyl-5,6-dichlorouracil 1,3-dimethyl-6-chlorouracil (100 g., 0.58 mole) in 1500 ml. of phosphorous oxychloride was heated to reflux. Phosphorous pentachloride (330 g., 1.58 moles) was added thereto in the following manner: 180 g. during the first hour, 50 g. during each of the three succeeding hours. The resulting solution was cooled, filtered to remove excess phosphorous pentachloride and then concentrated in vacuo. The residue was triturated with 1200 ml. of chloroform for one hour and filtered to remove the residual phosphorous pentachloride. The filtrate was concentrated in vacuo and the residue washed with water to remove phosphorous oxychloride and phosphorous pentachloride, then recrystallized from 1100 ml. of ethanol to afford the desired product, 80 g. (66%), M.P. 153.5–154.5° C.

*Analysis.*—Calc'd for $C_6H_6N_2O_2Cl_2$ (percent): C, 34.40; H, 3.08; N, 13.31; Cl, 33.9. Found (percent): C, 34.60; H, 2.78; N, 13.00; Cl, 33.12.

EXAMPLE V 1,3-dimethyl-5-bromo-6-chlorouracil

The procedure of Example IV is repeated using an equivalent amount of phosphorous pentabromide to afford the desired product.

EXAMPLE VI 1,3-dimethyl-5-chloro-6-(2-pyrimidylamino)uracil 2-aminopyrimidine (9.5 g., 0.1 mole) was dissolved in 50 ml. of dimethylsulfoxide, and sodium hydride (4.53 g. of 53% NaH in mineral oil, 0.1 mole) was added thereto portionwise with stirring and exclusion of air, over a twenty minute period. Stirring was continued for an additional ten minutes to complete the formation of the sodium salt of 2-aminopyrimidine. 1,3-dimethyl-5,6-dichlorouracil (11 g., 0.05 mole), prepared as in Example IV, was added portionwise with stirring and sufficient cooling to maintain the temperature at 30–40° C. The reaction was immediate and strongly exothermic. After being stirred for an additional ten minutes, the reaction mixture was poured into 4 volumes of ice water and extracted with hexane to remove the mineral oil. The solution was then neutralized with an excess of acetic acid and the product crystallized out. Recrystallization from methylene chloride/hexane afforded the desired product, M.P. 207–209.5° C.

*Analysis.* — Calc'd for $C_{10}H_{10}N_5O_2Cl$ (percent): C, 44.94; H, 3.75; N, 26.22. Found (percent): 44.78; H, 3.54; N, 26.17.

EXAMPLE VII 1,3-dimethyl-5-chloro-6-[2-(5-methyl-1,3,4-thiadiazolyl) amino]uracil The procedure of Example VI was repeated using an equivalent amount of 2-amino-5-methyl-1,3,4-thiadiazole in place of said 2-aminopyrimidine to produce the desired product, 9.3 g. (72%), M.P. 255–257° C.

*Analysis.* — Calc'd for $C_9H_{10}N_5O_2ClS$ (percent): C, 37.57; H, 3.50; N, 24.34; Cl, 12.32. Found (percent): C, 38.59; H, 3.30; N, 24.41; Cl, 12.39.

EXAMPLE VIII

The procedure of Example VI is repeated using an equivalent amount of appropriate amine in place of said 2-aminopyrimidine to produce the following compounds

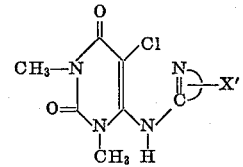

| | X' |
|---|---|
| 2-pyridyl | Hydrogen. |
| 2-pyrazinyl | Do. |
| 3-pyridazinyl | 6-methoxy. |
| 2-pyridyl | 4-methyl. |
| 4-pyrimidyl | 2,6-dimethyl. |
| 2-pyrimidyl | 4-methyl. |
| 3-(1,2,4-triazinyl) | Hydrogen. |
| 2-pyrazinyl | 3-carboxyl. |
| 5-tetrazolyl | 1-methyl. |
| 5-(1,2,4-triazolyl) | 1-carboxymethyl. |
| 2-pyridinyl | 5-carboxyl. |
| 2-(1,3,5-triazinyl) | Hydrogen. |
| 6-(1,2,4-triazinyl) | 3-methyl. |
| 2-oxazolyl | 4-isopropyl. |
| 2-(1,3,4-oxadiazolyl) | Hydrogen. |
| 3-furazanyl | Do. |
| 3-isothiazolyl | 5-methyl. |
| 2-imidazolyl | 1-methyl. |
| 2-quinolyl | Hydrogen. |
| 1-isoquinolyl | Do. |
| 4-quinazolyl | Do. |

EXAMPLE VIII-A

1,3-dimethyl-5-chloro-6-(2-thiazolylamino)uracil

The procedure of Example III-A was repeated using an equivalent amount of 1,3-dimethyl-5,6-dichlorouracil in place of said monochloro uracil, to afford the desired product, 18.7 g. (40%), M.P. 217–219° C. (dec.).

Analysis. — Calc'd for $C_9H_9N_4O_2ClS$ (percent): C, 39.6; H, 3.32; N, 20.6; Cl, 13.00. Found (percent): C, 39.73; H, 3.61; N, 19.74; Cl, 13.15.

EXAMPLE VIII-B

The procedure of Example VIII-A is repeated using an equivalent amount of appropriate amine in place of said 2-aminothiazole to produce the following compounds:

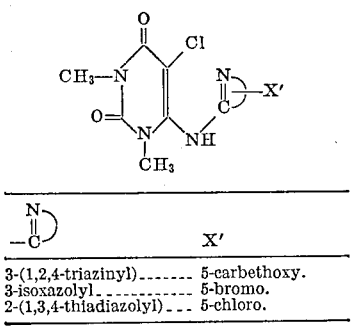

| | X' |
|---|---|
| 3-(1,2,4-triazinyl) | 5-carbethoxy. |
| 3-isoxazolyl | 5-bromo. |
| 2-(1,3,4-thiadiazolyl) | 5-chloro. |

EXAMPLE IX

1,3-dimethyl-5-bromo-6-(2-pyrimidylamino)uracil

The procedure of Example VI is repeated using an equivalent amount of 1,3-dimethyl-5-bromo-6-chlorouracil, prepared as in Example V, in place of said 1,3-dimethyl-5,6-dichlorouracil to produce the desired compound.

EXAMPLE X

1,3-dimethyl-1,2,3,4-tetrahydropyrazino[1,2-b]-6H-pyrimido[4,5-e][1,2,4]thiadiazine-2,4,5-trione 1,3-dimethyl-6-(2-pyrazinylamino)uracil (5.0 g., 0.02 mole), prepared as in Example II, was dissolved in 100 ml. of thionyl chloride at room temperature with stirring under anhydrous conditions. After two minutes, the solution became clear and a yellow, chloride-containing precipitate formed approximately five minutes thereafter. The mixture was heated for an additional twenty minutes at 50° C. with stirring, at which time the solid material had gone into solution. Thionyl chloride was removed in vacuo and the crystalline residue was recrystallized twice from methylene chloride/hexane without heating to yield the desired product, 2.60 g. (47%), M.P. 159° C. (dec.).

Analysis.—Calc'd for $C_{10}H_9N_5O_3S$ (percent): S, 11.45; Cl, 0.00. Found (percent) S, 10.85; Cl, 0.51.

Mass spectrum: M/e 279.

EXAMPLE XI

1,3-dimethyl-1,2,3,4-tetrahydrothiazolo[3,2-b]-6H-pyrimido[4,5-e][1,2,4-]thiadiazine-2,4,5-trione 1,3-dimethyl-6-(2-thiazolylamino)uracil (5.0 g., 0.02 mole) was dissolved in 200 ml. of thionyl chloride at room temperature with stirring, under anhydrous conditions. The thionyl chloride was removed in vacuo and the residue was recrystallized from methylene chloride/hexane to afford the desired product, 5.3 g. (92%, M.P. 218–220° C. (dec.).

Analysis.—Calc'd for $C_9H_8N_4O_3S_2$ (percent): C, 38.03; H, 2.84; S, 19.77. Found (percent): C, 37.57; H, 2.01; S, 21.82.

EXAMPLE XII

1,3,8 - trimethyl - 1,2,3,4 - tetrahydro[1,3,4]thiadiazolo-[3,2-b] - 6H - pyrimido[4,5-e][1,2,4]thiadiazine-2,4,5-trione 1,3 - dimethyl - 6 - [2-(5-methyl-1,3,4-thiadiazolyl)] aminouracil (10.0 g., 0.04 mole), prepared as in Example II, was dissolved in 200 ml. of thionyl chloride and refluxed for ten minutes under anhydrous conditions. The thionyl chloride was removed in vacuo and the residue was recrystallized from methylene chloride/hexane to afford the desired product, 8.1 g. (68%), M.P. 240–242° C.

Analysis.—Calc'd for $C_9H_9N_5O_3S_2$ (percent): C, 36.11; H,3.03; N, 23.40; S, 21.42. Found (percent): C, 36.37; H, 2.86; N, 21.91; S, 21.26.

EXAMPLE XIII

1,3,9-trimethyl-1,2,3,4-tetrahydropyrido[1,2-b]-6H-pyrimido[4,5-e][1,2,4]thiadiazine-2,4,5-trione The procedure of Example XII was repeated using an equivalent amount of 1,3-dimethyl-6-[2-(4-methylpyridyl)] aminouracil, prepared as in Example II, in place of said thiadiazolylaminouracil, to afford the desired product, M.P. 249.5–251.5° C.

EXAMPLE XIV

1,3-dimethyl - 8 - methoxy-1,2,3,4-tetrahydropyridazino [2,3-b] - 6H - pyrimido[4,5-e][1,2,4]thiadiazine-2,4,5-trione 1,3-dimethyl - 6 - [3-(6-methoxypyridazinyl)]aminouracil (500 mg., 0.002 mole), prepared as in Example II, was dissolved in 15 ml. of thionyl chloride by heating on a steam bath. The thionyl chloride was then boiled off under a stream of nitrogen and the residue was recrystallized from thionyl chloride/methylene chloride to afford the desired product.

EXAMPLE XV

The following compounds containing an activated 2H-1,2,4-thiadiazinyl-1-oxide moiety are prepared by dissolving 0.05 mole of an appropriate 1,3-dimethyl-6-(substituted)aminouracil, prepared as in Examples I–III, in 150 ml. of thionyl chloride under anhydrous conditions, at a temperature and for a time sufficient to cause formation of hydrogen chloride but insufficient to cause thermal decomposition.

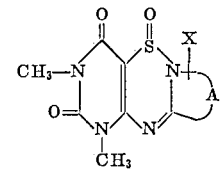

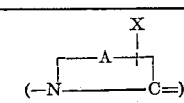

—CH:CH·CH:CH—
—C(CH₃):N·C(CH₃):CH—
—CH:CH·C(CH₃):N—
—N:CH·CH:N—
—CH:CH·N:N—
—CH:CH·N:C(COCl)—
—N:N·N(CH₃)—
—N:CH·N(CH₂COCl)—
—CH:C(COCl)·CH:CH—
—CH:N·CH:N—
—N:CH·C(CO₂Et):N—
—N:C(CH₃)·N:CH—
—C(i-Pr):CH'O—
—O·C(Br):CH—
—N:CH·O—
—O·N:CH—
—S·C(CH₃):CH—
—N:C(Cl)·S—
—CH:CH·N(CH₃)—

17
TABLE—Continued

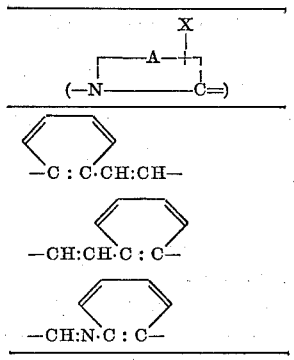

| R | R' | X<br>┌─A─┐<br>(—N———C=) |
|---|---|---|
| $C_2H_5$ | $C_2H_5$ | —CH:CH·CH:CH— |
| $1-C_3H_7$ | $CH_3$ | —CH:CH·CH:CH— |
| $n-C_6H_{13}$ | $n-C_6H_{13}$ | —CH:N·CH:CH— |
| $CH_2CH=CH_2$ | $CH_2CH=CH_2$ | —N:CH·S— |
| $CH_3$ | $(CH_2)_2CH=C(CH_3)_2$ | —CH:C(CH_3)·N:CH— |

EXAMPLE XVI

The following compounds containing an activated 2H-1,2,4-thiadiazinyl-1-oxide moiety are prepared by dissolving 0.05 mole of the appropriate 1,3-disubstituted-6-(substituted)aminouracils, prepared by the procedure of Example I, in 150 ml. of thionyl chloride under anhydrous conditions, at a temperature and for a time sufficient to cause formation of hydrogen chloride but insufficient to cause thermal decomposition.

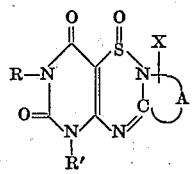

EXAMPLE XVII 1,3-dimethyl-1,2,3,4-tetrahydropyrido[2,1-f]purine-2,4-dione 1,3-dimethyl-6-(2-pyridylamino)uracil (8.0 g., 0.035 mole), prepared as in Example I, was added to 200 ml. of thionyl chloride and the mixture was refluxed for five minutes under anhydrous conditions. The solvent was removed in vacuo and the residue was crystallized from chloroform/hexane/methanol and then passed through Alumina, Activity III, with benzene. The product was then sublimed to afford the desired material, 2.0 g. (26%), M.P. 259–261° C.

*Analysis.*—Calc'd for $C_{11}H_{10}N_4O_2$ (percent): C, 57.38; H, 4.38; N, 24.34. Found (percent): C, 57.53; H, 4.01; N, 24.50.

EXAMPLE XVIII 1,3-dimethyl-1,2,3,4-tetrahydropyrimido[2,1-f]purine-2,4-dione 1,3-dimethyl-6-(2-pyrimidylamino)uracil (10 g., 0.043 mole), prepared as in Example II, was added to a slurry of 200 g. of finely powdered potassium carbonate in 400 ml. of thionyl chloride under anhydrous conditions. The mixture was refluxed with vigorous stirring for 90 minutes and then filtered. Thionyl chloride was removed from the filtrate in vacuo, and the residue was taken up in a mixture of water (pH 12) and methylene chloride. Exhaustive extraction into the methylene chloride and removal of solvent afforded the desired product, which was purified by recrystallization from one liter of water/methanol(2:1), 5.7 g. (56%), M.P. 239–241° C.

*Analysis.*—Calc'd for $C_{10}H_9N_5O_2$ (percent): C, 51.94; H, 3.92; N, 30.29. Found (percent): C, 52.23; H, 3.98; N, 30.19.

EXAMPLE XIX

The following imidazoles were prepared by heating the appropriate sulfinamides, prepared as in Examples XI–XIV, to a temperature between 150° C. and 300° C., sufficient to cause evolution of sulfur-containing byproducts. The desired products were isolated by sublimation and purified by recrystallization.

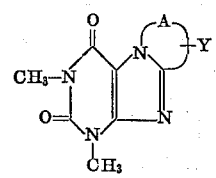

| Y<br>┌─A─┐<br>(—N———C=) | M.P., °C. | Analysis Calc'd | | | Found | | |
|---|---|---|---|---|---|---|---|
| | | C | H | N | C | H | N |
| CH:CH·N:CH | 251–252.5 | 51.94 | 3.92 | 30.29 | 51.68 | 3.72 | 30.26 |
| CH:CH·C(CH_3):CH | 227–229 | 59.01 | 4.95 | 22.94 | 58.87 | 5.04 | 23.14 |
| N:C(OCH_3)-CH:CH | 251–252 | 50.57 | 4.24 | 26.81 | 50.81 | 4.00 | 26.96 |
| CH:CH·S | 250.5–251.5 | 45.76 | 3.41 | 23.72 | 45.83 | 3.31 | 23.57 |
| N:C(CH_3)·S | 232–233 | 43.03 | 3.61 | 27.88 | 43.01 | 3.39 | 27.24 |

EXAMPLE XX

The following imidazoles are prepared by treating the appropriate 1,3-dimethyl-6-(substituted)aminouracil, prepared as in Example III, with thionyl chloride, as in Example X, and subjecting the resulting 2H-1,2,4-thiadiazinyl-1-oxide intermediate to a sufficiently high temperature, as in Example XVII, to cause evolution of sulfur-containing byproducts. More thionyl chloride reflux temperature is insufficient, the intermediate is isolated and heated as in Example XIX.

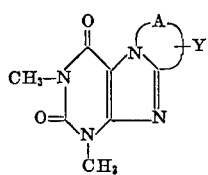

```
          Y
       ┌─A─┐
    (─N   C═)
```

—C(CH₃):N·C(CH₃):CH—
—CH:CH·C(CH₃):N—
—N:CH—CH:N—
—CH:CH—N:N—
—CH:CH·N:C(COCl)—
—CH:CH·N:C(CO₂H)—ᵃ
—N:N·N(CH₃)—
—N:CH·N(CH₂COCl)—
—N:CH·N(CH₂CO₂H)—ᵃ
—CH:C(COCl)·CH:CH—
—CH:C(CO₂H)·CH:CH—ᵃ
—CH:N·CH:N—
—N:CH·C(CO₂Et):N—
—N:C(CH₃)·N:CH—
—C(i-Pr):CH·O—
—O·C(Br):CH—
—N:CH·O—
—O·N:CH—
—S·C(CH₃):CH—
—N:C(Cl)·S—
—CH:CH·N(CH₃)—

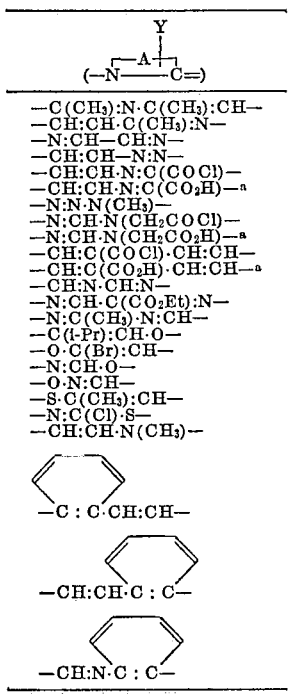

ᵃ By hydrolysis of corresponding chloroformyl substituent.

EXAMPLE XXI

The following 1,2,3,4 - tetrahydroheterocyclo[x,y - f] purine-2,4-diones are prepared by treating the appropriate 1,3-disubstituted-6-(substituted)aminouracils with thionyl chloride, as in Example XVI and heating the resulting reaction mixture to a temperature sufficient to cause extrusion of sulfur monoxide. Where thionyl chloride reflux temperature is insufficient, the 2H-1,2,4-thiadiazinyl-1-oxide is isolated and heated as in Example XIX.

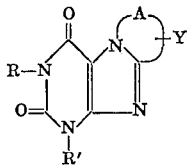

| R | R' | (—N———C═) |
|---|---|---|
| C₂H₅ | C₂H₅ | —CH:CH·CH:CH— |
| i—C₃H₇ | C₂H₅ | —CH:CH·CH:CH— |
| n—C₅H₁₃ | CH₃ | —CH:N·CH:CH— |
| n—C₅H₁₃ | n—C₅H₁₃ | —N:CH·S— |
| CH₂CH=CH₂ | CH₂CH=CH₂ | —N:CH·S— |
| CH₃ | (CH₂)₂CH=C(CH₃)₂ | —CH:C(CH₃)·N:CH— |

EXAMPLE XXII 1,3-dimethyl-1,2,3,4-tetrahydropyrido[2,1-f]purine-2,4-dione 1,3-dimethyl-5,6-dichlorouracil (209 mg., 0.001 mole) was dissolved in 50 ml. of dimethylsulfoxide and 10 equivalents of 2-aminopyridine was added thereto. The mixture was heated under nitrogen for 16 hours at 120° C., and the solvent was removed in vacuo. The residue was then chromatographed through Alumina, Activity II, in chloroform to yield the desired product. Physical properties are identical with those of the material prepared in Example XVII.

EXAMPLE XXIII 1,3-dimethyl-1,2,3,4-tetrahydropyrimido [2,1-f]purine-2,4-dione 1,3-dimethyl-5-chloro-6-(2-pyrimidyl)aminouracil (250 mg., 0.001 mole), prepared as in Example VI, was placed in a sublimation tube and heated to 250° C. for ten minutes. The desired product was then distilled out in vacuo and purified by sublimation, 120 mg. (52%). Physical properties are identical with those of the material prepared in Example XVIII.

EXAMPLE XXIV

The following imidazoles are prepared by heating the appropriate 1,3-dimethyl-5-chloro-6-(substituted)aminouracil, prepared as in Example VIII, according to the procedure of Example XXIII.

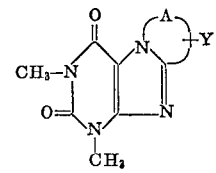

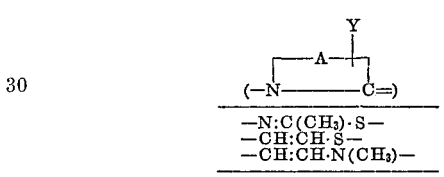

—N:C(CH₃)·S—
—CH:CH·S—
—CH:CH·N(CH₃)—

EXAMPLE XXV 1,3-dimethyl-8-bromomethyl-1,2,3,4-tetrahydropyrido [2,1-f]purine-2,4-dione 1,3,8 - trimethyl-1,2,3,4-tetrahydropyrido[2,1-f]purine-2,4-dione (4.88 g., 0.02 mole), prepared as in Example XIX, N-bromosuccinimide (3.70 g., 0.0205 mole) and benzoyl peroxide (200 mg., 0.5 mmole) were added to 250 ml. of dry carbon tetrachloride. The resulting slurry was subjected to strong ultraviolet radiation with continuous, vigorous stirring. After ten minutes, reflux temperature was reached and a clear solution formed. The reaction was continued for an additional ten minutes, after which time the mixture was cooled and concentrated in vacuo. The resulting crystalline residue was triturated with 100 ml. of water; the desired product was obtained by filtration and purified by recrystallization from benzene/chloroform, 3.10 g. (48%), M.P. 266–268° C.

EXAMPLE XXVI 1,3-dimethyl-8-hydroxymethyl-1,2,3,4-tetrahydropyrido [2,1-f]purine-2,4-dione The 8-bromomethyl compound of Example XXV (1.50 g., 4.65 mmole) was slurried in 100 ml. of water and 15 ml. of saturated sodium bicarbonate solution and refluxed for two hours, after which time most of the material had dissolved. The solution was cooled and filtered, neutralized with acetic acid and concentrated to one half its volume. The resulting precipitate was collected by filtration and recrystallized from chloroform/methanol to afford the desired product, 670 mg. (55.5%), M.P. 238–241.5° C.

EXAMPLE XXVII 1,3-dimethyl-8-dimethylaminomethyl-1,2,3,4-tetrahydropyrido[2,1-f]purine-2,4-dione The 8-bromomethyl compound of Example XXV (3.00 g., 9.3 mmole) was dissolved in 250 ml. of chloroform and 100 ml. of anhydrous dimethylamine. The solution was then concentrated one-third of its volume and washed with 100 ml. of 0.1 N sodium hydroxide solution which had been saturated with sodium chloride. The basic, aqueous solution was then extracted with chloroform (2× 50 ml.), and the chloroform extracts were combined, dried over sodium sulfate, and evaporated to dryness. The residue was first recrystallized from cyclohexane and then from methanol to afford the desired product as colorless crystals, 1.60 g. (60%), M.P. 147–149° C.

*Analysis.*—Calc'd for $C_{14}H_{15}N_5O_2$ (percent): C, 58.52; H, 5.96; N, 24.38. Found (percent): C, 58.24; H, 5.72; N, 24.30.

EXAMPLE XXVIII 1,3-dimethyl-8-(N-methylpiperazino)methyl-1,2,3,4-tetrahydropyrido[2,1-f]purine-2,4-dione The 8-bromomethyl compound of Example XXV (1.00 g., 3.1 mmole) was dissolved in 100 ml. of chloroform and N-methylpiperazine (5.00 g., 20 mmole) was added thereto. The resulting mixture was refluxed for 1 hour, cooled and washed with 0.1 N sodium hydroxide. The aqueous layer was washed with more chloroform (2× 50 ml.) and the chloroform fractions were combined, dried over sodium sulfate and evaporated to dryness in vacuo. The residue was recrystallized from methanol to yield the desired product as colorless crystals, 430 mg. (41%), M.P. 177–178° C.

EXAMPLE XXIX 1,3-dimethyl-8-diethylaminomethyl-1,2,3,4-tetrahydropyrido[2,1-f]purine-2,4-dione The procedure of Example XXVIII was repeated using anhydrous diethylamine in place of said N-methylpiperazine to yield the desired product, 910 mg. (47%), M.P. 126–128° C.

EXAMPLE XXX 1,3-dimethyl-8-methoxymethyl-1,2,3,4-tetrahydropyrido[2,1-f]purine-2,4-dione The 8-bromomethyl compound of Example XXV (3.95 g., 14.4 mmole) was mixed with 750 ml. of hot methanol, and sodium methoxide (2.64 g., 57.6 mmole) was added thereto. The mixture was refluxed 90 minutes, after which time a clear solution resulted which was then concentrated to about 400 ml. The solution was cooled and the resulting precipitate was collected and recrystallized from methanol to yield the desired product, 2.33 g. (70%), M.P. 195–197.5° C.

*Analysis.*—Calc'd for $C_{13}H_{14}N_4O_3$ (percent): C, 56.93; H, 5.15. Found (percent): C, 56.87; H, 4.97.

EXAMPLE XXXI 1,3-dimethyl-8-carboxy-1,2,3,4-tetrahydropyrido[2,1-f]-2,4-dione The 8-methoxymethyl compound of Example XXX (1.60 g., 6.2 mmole) was added to 100 ml. of boiling water, and potassium permanganate (4.80 g., 31 mmole) was added thereto portionwise as fast as decoloration occurred (about 20 minutes). The mixture was then cooled and sulfur dioxide was bubbled through to destroy manganese dioxide. A colorless solution resulted from which crystals soon formed, which were collected and purified by an acid-base precipitation followed by recrystallization from methanol. The desired product was thus obtained as colorless crystals, 410 mg. (26%), M.P. 360° C.

*Analysis.*—Calc'd for $C_{12}H_{10}N_4O_4$ (percent): C, 52.55; H, 3.68. Found (percent): C, 52.78; H, 3.65.

EXAMPLE XXXII 1,3,7-trimethyl-1,2,3,4-tetrahydropyrido-[2,1-f]purine-2,4-dione 1,3-dimethyl-6-[2-(5-methylpyridyl)amino]uracil (7.0 g., 0.0285 mole), prepared as in Example II, was dissolved in 140 ml. of thionyl chloride, with generation of heat and gaseous byproducts noted. The resulting clear yellow solution was evaporated to dryness in vacuo, and the residue was heated to 250° C. under a high vacuum. A yellow oil distilled out and crystallized to give the desired product, which was then recrystallized from methanol, 3.59 g. (56%), M.P. 219–221° C.

*Analysis.*—Calc'd for $C_{12}H_{12}N_4O_2$ (percent): C, 59.01; H, 4.95. Found (percent): C, 58.99; H, 5.19.

EXAMPLE XXXIII 1,3,9-trimethyl-1,2,3,4-tetrahydropyrido-[2,1-f]purine-2,4-dione The procedure of Example XXXII was repeated using an equivalent amount of 1,3-dimethyl-6-[2-(3-methylpyridyl)amino]uracil as prepared in Example II. The reaction residue was heated to 300° C. under high vacuum to give the desired product (62%), M.P. 251–253° C.

EXAMPLE XXXIV

Pharmaceutically-acceptable salts

The hydrochloric acid addition salt of 1,3-dimethyl-8-dimethylaminomethyl - 1,2,3,4 - tetrahydropyrido[2,1-f] purine - 2,4-dione is prepared by mixing an alcoholic solution of the free base with aqueous hydrochloric acid and evaporating the resulting solution.

Other pharmaceutically-acceptable acid addition salts of this compound are prepared by this same procedure employing hydrobromic acid, hydriodic acid, nitric acid, sulfuric acid, citric acid, phosphoric acid, maleic acid, tartaric acid and lactic acid in place of said hydrochloric acid.

EXAMPLE XXXV

Tablets

A tablet base was prepared by blending the following ingredients in the proportion by weight indicated:

| | |
|---|---|
| Maize starch | 20.0 |
| Dibasic calcium phosphate | 74.0 |
| Alginic acid | 16.0 |

Into this tablet base was blended sufficient 1,3-dimethyl-1,2,3,4-tetrahydropyrido[2,1-f]purine-2,4-dione to provide tablets containing 20, 100 and 250 mg. of active ingredient per tablet. The composition was compressed into tablets, each weighing 360 mg., by conventional means.

EXAMPLE XXXVI

Capsules

A blend was prepared containing the following ingredients in the proportion by weight indicated:

| | |
|---|---|
| Maize starch | 100 |
| Sodium lauryl sulfate | 3.5 |

To this blend was added sufficient 1,3-dimethyl-1,2,3,4-tetrahydropyrimido[2,1-f]purine - 2,4 - dione to provide capsules containing 20, 100 and 250 mg. of active ingredient per capsule. The composition was filled into conventional hard gelatin capsules at the rate of 350 mg. per capsule.

EXAMPLE XXXVII

Injectable preparation

One thousand grams of 1,3-dimethyl-8-dimethylaminomethyl-1,2,3,4-tetrahydropyrido[2,1-f]purine - 2,4 - dione hydrochloride are intimately mixed and ground with 2500 grams of sodium ascorbate. The ground dry mixture is placed in vials and sterilized with ethylene oxide after which the vials are sterilely stoppered. For intravenous administration, sufficient water is added to the materials in the vials to form a solution containing 10 mg. of active ingredient per milliliter of injectable solution.

EXAMPLE XXXVIII

Oral suspension

A suspension is prepared with the following composition:

70% aqueous sorbitol—741.29 g.
Glycerine, U.S.P.—185.35 g.
Gum acacia (10% solution)—100.0 ml.
Polyvinylpyrrolidone—0.5 g.
Distilled water—sufficient to make 1 liter.

Sufficient 1,3 - dimethyl-1,2,3,4-tetrahydrothiazolo[2,3-f] purine-2,4-dione is added to achieve a concentration of 23 mg. of effective ingredient per milliliter. To this suspension, various sweeteners and flavorants may be added to improve the palatability of the suspension.

EXAMPLE XXXIX

Parenteral solution

A solution of 1,3 - dimethyl-8-diethylaminomethyl-1,2,3,4 - tetrahydropyrido[2,1-f]purine-2,4-dione hydrochloride is prepared with the following composition:

Effective ingredient—2.5 grams
Polyethylene glycol-200—400 ml.
Water, distilled—100 ml.

The resultant solution had a concentration of effective ingredient of 5 mg./ml. and was suitable for all forms of parenteral and especially for intravenous administration.

EXAMPLE XL

Phosphodiesterase inhibition

Compounds of this invention were evaluated with respect to their power to inhibit the dephosphorylating activity of cyclic 3',5'-nucleotide phosphodiesterase by which activity 3',5'-adenosine monophosphate is converted to 5'-adenosine monophosphate.

The cyclic 3',5'-nucleotide phosphodiesterase was isolated by the procedure of R. W. Butcher and E. W. Sutherland, J. Biol. Chem. 237, 1244 (1962) and their purification procedure was carried through the third step given, namely through the ammonium sulfate fractionation, dialysis and freezing steps, but not through the chromatographic fractionation step.

Theophylline, a known inhibitor of the enzyme, was run for each novel compound. Thus, at least three substrates, each containing 3',5'-adenosine monophosphate, were run for each novel compound being evaluated. One contained the novel compound, another contained theophylline, and the last contained no phosphodiesterase inhibitor at all. Each substrate had a total volume of 2 ml., was $4\times10^{-4}$ molar in 3',5'-adenosine monophosphate, contained 0.02 ml. of cyclic 3',5'-nucleotide phosphodiesterase and 4.0 µmoles of $MgSO_4$, 0.2 µmoles of ethylenediaminetetraacetic acid and 80 µmoles of a suitable buffer to maintain the pH at 7.5. Where the substrate contained a novel compound whose phosphodiesterase inhibitory power was to be tested or contained the control inhibitory compound, the compound was present at a concentration of $10^{-3}$ molar.

Each substrate was incubated for 30 minutes at 30° C. after which time the reaction was stopped by boiling for 10 minutes. At this point one mg. of lyophilized Crotolus atrox venom dissolved in one ml. of pH 7.5 buffer was added and the new mixture was incubated for 30 minutes at 30° C. and this reaction was also stopped by boiling for 10 minutes. The venom reacts with 5'-adenosinemonophosphate, the dephosphorylation product, to release inorganic phosphate which was isolated by means of an ion exchange procedure. The inorganic phosphorus was determined colorimetrically by the methods of C. H. Fiske and Y. Subbarow, J. Biol. Chem., 66, 375 (1925). Thus, a low final concentration of inorganic phosphate indicates that a small amount of 5'-adenosine monophosphate was formed and, therefore, that the phosphodiesterase activity was inhibited.

The percent inhibition was taken as 100 times the difference between the inorganic phosphate concentration in the substrate containing the inhibiting compound and the concentration in the substrate containing no inhibitor divided by the concentration in the substrate without inhibitor.

The following compounds were evaluated:

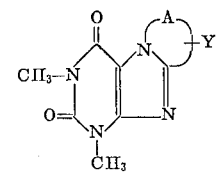

| Y $(-N-A-C=)$ | Percent inhibition | Theophylline, percent inhibition |
|---|---|---|
| —CH=CH—N=CH— | 42 | 71 |
| —CH=CH—CH=CH— | 99 | 71 |
| —CH=CH—CH=N— | 27 | 71 |
| —N=C(CH₃)—S— | 31 | 63 |
| —CH=CH—S— | 49 | 45 |
| —CH=CH—C(CH₃)=CH— | 46 | 43 |
| —N=C(OCH₃)—CH=CH— | 37 | 43 |
| —CH—C(CH₃)—CH=CH— | 40 | 43 |
| —CH=CH—CH=C(CH₃)— | 39 | 43 |
| —CH=CH—C(CH₂OCH₃)=CH— | 39 | 43 |
| —N=C(OH)—CH=CH— | 79 | 43 |
| —CH=CH—C(CO₂H)=CH— | 79 | 43 |
| —CH=CH—C(CH₂N—Me₂)=CH— | 23 | 72 |
| —CH=CH—C(CH₂N—Et₂)=CH— | 66 | 72 |
| —CH=CH—C(CH₂N◯N—Me)=CH— | 55 | 72 |
| —CH=CH—C(CH₂OH)=CH— | 83 | 72 |

The following compounds were similarly tested for phosphodiesterase inhibitory activity:

| Compound | Percent inhibition | Theophylline, percent inhibition |
|---|---|---|
| [structure with CH₃—N, O=, NH, S, CH₃] | 69 | 37 |
| [structure with CH₃—N, O=, N, S, CH₃] | 56 | 55 |

EXAMPLE XLI

Bronchodilator activity

Eight conscious female guinea pigs, which had been fasted for 12 hours, received an oral dosage of 1,3-dimethyl-1,2,3,4-tetrahydropyrido[2,1-f]purine-2,4-dione at 60 mg./kg. Control animals received doses of saline solution. One hour after the administration, each animal was challenged with histamine aerosol.

The challenge procedure consisted of spraying a 0.4 percent aqueous solution of histamine, at a pressure of 5 lb./in.² into an 8 x 8 x 12 inch plastic container for one minute. Immediately after the container was subjected to the histamine spray the animal was placed within it. At the end of one minute of exposure, the respiratory status, which is a reflection of bronchoconstriction, was evaluated. Evaluation levels were designated and scored as normal breathing (0), slightly deepened breathing (1), labored breathing (2), severely labored breathing and ataxia (3) and unconsciousness (4). The average score for the test group was compared with that of the control group and the difference was expressed as percent protection. 1,3 - dimethyl-1,2,3,4-tetrahydropyrido[2,1-f]purine-2,4-dione afforded 14% protection against histamine-induced bronchoconstriction according to this protocol.

EXAMPLE XLII

Diuretic activity

Compounds to be evaluated for diuretic activity were suspended in 0.9% saline, at a concentration sufficient to provide a dosage level of 100 mg./kg. when the saline solution is administered at a level of 50 ml./kg. The solution was administered orally (100 mg./kg.) to groups of 12 mice which had been fasted for the previous 20 hours. Subgroups of 4 mice each are placed in single metabolism cages and urine is collected for 5 hours. Mean values for urine volume are determined for each set of 3 subgroups and are compared to saline control and tested for significance by the method of Dunnett, American Statistical Association Journal 50, 1096 (1955).

The following compounds were evaluated for diuretic activity and found to be active. Urine volumes are expressed in terms of ml./kg./5 hours.

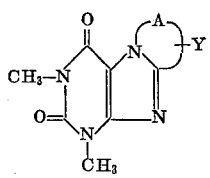

| Y<br>(—N—A—C=) | Urine volume | Control urine vol. |
|---|---|---|
| —CH=CH—CH=CH— | 39.9 | 32.0 |
| —CH=CH—CH=N— | 51.4 | 37.7 |
| —CH=CH—N=CH— | 47.6 | 32.0 |
| —N=C(CH₃)—S— | 65.5 | 38.1 |
| —CH=CH—S— | 33.3 | 24.6 |
| —N=C(OCH₃)—CH=CH— | 53.3 | 27.1 |
| —CH=CH—C(CH₂N—Me₂)=CH— | 42.4 | 28.7 |
| —CH=CH—C(CH₂N—Et₂)=CH— | 33.9 | 28.0 |

Sodium and potassium levels in the above urine samples were determined by means of a flame photometer. The following compounds were found to lower the level of potassium excretion significantly:

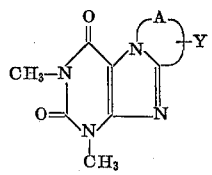

| Y<br>(—N—A—C=) | Na⁺/K⁺ | Control Na⁺/K⁺ |
|---|---|---|
| —CH=CH—CH=CH— | 3.4 | 2.3 |
| —CH=CH—CH=N— | 5.5 | 2.3 |
| —CH=CH—N=CH— | 5.8 | 2.3 |
| —N=C(CH₃)—S— | 5.5 | 3.3 |
| —CH=CH—S— | 4.2 | 2.5 |
| —CH=CH—C(CH₂N—Me₂)=CH— | 3.2 | 2.0 |
| —CH=CH—C(CH₂N—Et₂)=CH— | 3.5 | 2.2 |

EXAMPLE XLIII

Anti-inflammatory activity

Compounds of this invention were evaluated for anti-inflammatory activity by means of their response to the carrageenin rat food edema test. Unanesthetized adult male albino rats of 150–190 g. body weight are each numbered, weighed and marked with ink on the right lateral malleolus. One hour after administration of the drug by gavage at a dosage level of 100 mg./kg., edema is induced by injection of 0.05 ml. of 1% solution of carrageenin into the plantar tissue of the marked paws. Immediately thereafter, the volume of the injected paw is measured. The increase in volume three hours after the injection of carrageenin constitutes the individual response. Activity is expressed in terms "percent control" whereby the volume increase of a treated animal is compared to volume increase of a control, untreated animal. The standard compound is aspirin at 100 mg./kg. by oral administration.

The following compounds evaluated were:

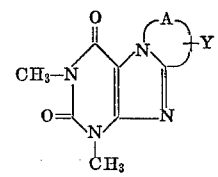

| Y<br>(—N—A—C=) | Percent control | Aspirin, percent control |
|---|---|---|
| —CH=CH—CH=N— | 65.4 | 45.1 |
| —CH=CH—CH=CH— | 17.0 | 41.5 |
| —CH=CH—N=CH— | 23.3 | 54.8 |

1,3 - dimethyl - 6 - [5-methyl-2-(1,3,4)thiadiazolylamino] uracil was similarly evaluated, 26.3% control; aspirin, 57.9% Control.

What is claimed is:

1. A process for the preparation of an imidazole compound of the formula:

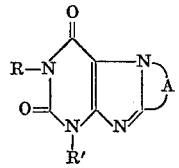

wherein R and R′ are each selected from alkyl containing up to 6 carbon atoms or alkenyl containing up to 6 carbon atoms, and A is such that

is a heteroaromatic ring system selected from the group consisting of 2-pyridyl, 2-pyrazinyl, 2-pyrimidyl, 4-pyrimidyl, 2-(1,3,5-triazinyl), 3-(1,2,4-triazinyl), 5-(1,2,4-triazinyl), 6-(1,2,4-triazinyl), 3-pyridazinyl, 2-oxazolyl, 3-isoxazolyl, 2-(1,3,4-oxadizolyl), 3-furazanyl, 2-thiazolyl, 3-isothiazolyl, 2-(1,3,4-thiadiazolyl), 2-(1-methyl)imidazolyl, 2-quinolyl, 1-isoquinolyl and 4-quinazolyl, which comprises reacting an activated N-vinylamidine of the formula

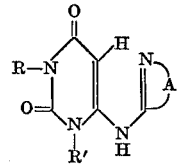

wherein R, R′ and A are as aforesaid, with thionyl chloride in at least about one molar equivalent amount, and dethionylating the resulting activated 2H-1,2,4-thiadiazinyl-1-oxide intermediate of the formula

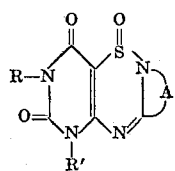

by heating at a temperature in the range of between about the reflux point and the decomposition point of the reaction mixture, whereby sulfur monoxide is extruded.

2. The process of claim 1 wherein R and R' are each methyl.

References Cited
UNITED STATES PATENTS
3,143,558  8/1964  Kresse et al. _____ 260—243 X JOHN M. FORD, Primary Examiner U.S. Cl. X.R.

260—243 R, 248 CS, 256.4 F, 256.5 R, 260, 309; 424—251